(12) United States Patent
Kyung (10) Patent No.: US 11,363,033 B2
(45) Date of Patent: Jun. 14, 2022

(54) TIME-DEPENDENT BLOCKCHAIN-BASED SELF-VERIFICATION USER AUTHENTICATION METHOD

(71) Applicant: Ho Yun Kyung, Seoul (KR)

(72) Inventor: Ho Yun Kyung, Seoul (KR)

( * ) Notice: Subject to any disclaimer, the term of this patent is extended or adjusted under 35 U.S.C. 154(b) by 211 days.

(21) Appl. No.: 16/633,151

(22) PCT Filed: Jun. 14, 2018

(86) PCT No.: PCT/KR2018/006710
§ 371 (c)(1),
(2) Date: Jan. 22, 2020

(87) PCT Pub. No.: WO2019/027139
PCT Pub. Date: Feb. 7, 2019

(65) Prior Publication Data
US 2020/0204567 A1 Jun. 25, 2020

(30) Foreign Application Priority Data
Aug. 4, 2017 (KR) .......................... 10-2017-0098764

(51) Int. Cl.
| | |
|---|---|
| *H04L 29/06* | (2006.01) |
| *H04L 9/40* | (2022.01) |
| *G06F 16/23* | (2019.01) |
| *G06Q 20/06* | (2012.01) |
| *G06Q 20/38* | (2012.01) |
| *H04L 9/08* | (2006.01) |

(52) U.S. Cl.
CPC ........ *H04L 63/108* (2013.01); *G06F 16/2365* (2019.01); *G06Q 20/065* (2013.01); *G06Q 20/389* (2013.01); *H04L 9/0894* (2013.01); *H04L 63/0884* (2013.01)

(58) Field of Classification Search
None
See application file for complete search history.

(56) References Cited

U.S. PATENT DOCUMENTS

2016/0275461 A1* 9/2016 Sprague ................ H04L 9/3234

FOREIGN PATENT DOCUMENTS

| KR | 10-0502066 B1 | 7/2005 |
|---|---|---|
| KR | 100502066 B1 * | 7/2005 |

(Continued)

*Primary Examiner* — Andrew J Steinle
(74) *Attorney, Agent, or Firm* — KORUS Patent, LLC; Seong Il Jeong (57) ABSTRACT

A time-dependent blockchain based self-verification user authentication method of the present disclosure includes, a reservation registration step for registering reservation time which is obtained by adding a set time to an input time, and an authentication subject to a blockchain which is distributed and stored in a plurality of nodes; a reservation notification step for notifying a notification group, which is associated with the authentication subject, of a reservation registered in the reservation registration step; a verification step for verifying authentication request time and the reservation time, which has been registered to the blockchain, when there is an authentication request with respect to the authentication subject; and a step for granting authentication when the authentication request time is within a valid range of the reservation time in the verification step.

10 Claims, 6 Drawing Sheets

(56) References Cited

FOREIGN PATENT DOCUMENTS

| KR | 10-1436404 | B1 | | 9/2014 | |
|----|------------|----|----|--------|----|
| KR | 10-1523340 | B1 | | 5/2015 | |
| KR | 10-1651563 | B1 | | 9/2016 | |
| KR | 101651563 | B1 | * | 9/2016 | |
| KR | 10-1678795 | B1 | | 11/2016 | |
| WO | WO-2018020389 | A2 | * | 2/2018 | ......... G06Q 20/3829 |

* cited by examiner

TIME-DEPENDENT BLOCKCHAIN-BASED SELF-VERIFICATION USER AUTHENTICATION METHOD

TECHNICAL FIELD

The present application relates to a time-dependent blockchain-based self-verification user authentication method.

BACKGROUND ART

A significant portion of economic activity occurs online, regardless of the size of the individual, state, or organization. In order to make a transaction online, a technology to identify the other party is needed. Various authentication technologies for user identification have been commercialized, but hacking incidents caused by the leakage of secret keys (including passwords) are occurring continuously.

In general, two-factor authentication and such is being commonly used to prepare for such hacking incidents. However, it is inconvenient because the number of steps is increased and an authentication medium such as an OTP must be carried. Therefore, it distances users with less digital familiarity from online. Above all, two-factor authentication is also insecure for remote hacking of user terminals.

The main security technologies are broadly classified to include encryption, authentication, authorization, and auditing. Encryption transforms important data so that it cannot be used by unauthorized users. Authentication is a technique that controls data access so that only legitimate users can use it. Authorization is a technique that allows only legitimate users and authenticated units to access data, and auditing is a technique that records how a user's data was handled to clarify future verification or accountability.

According to authentication methods, user authentication methods are classified into password, token, biometric information, and location information. The token refers to a unique identification device such as a security card or security USB. Among the above four methods, there is a limit in expanding the usage of the method with high security, since authentication based on physical information or information on physical characteristics can be used permanently when it is digitized and leaked out. Currently, most authentication methods use a mixture of two or more authentication methods (2 or 3 factors). Typical user authentication methods are as follows.

The PKI authentication methods include USB tokens and USIMs and such, as a method that does not use client software, and include storing and using public certificates as a method that uses client software. Such an authentication method has the inconvenience of having to carry a certificate.

The IP-geographic location identification method determines whether the geographic location of the IP address that is assigned and is currently being used is a commonly used location for the user. However, the IP address can be manipulated.

The identifier method is a method of storing user information (fingerprint, iris) in a system profile and verifying it. A file system or dedicated software is used. Although excellent as an authentication method, it is expensive.

The knowledge-based authentication method is a method that requires questions to be answered on specific personal information based on a user's memory. Patterns can be tolerant if exposed to hackers for a long time.

The Out of Band method includes telephone answering, Email, SMS, OTP, etc., but it is important for the authentication process to not use the same authentication path. It is high in cost and has low usability.

The OTP authentication method is a method in which a dedicated terminal and server share variables generated in synchronization with a specific key and dynamic values (time, stock, etc.). The convenience in use decreases.

The main problem with user authentication is MITM (Man In The Middle) attacks, and authentication methods that can respond to this include a combination of token-based PKI and Out Of Band methods.

The main problem with existing user authentication technologies is in order to cope with the exposure of secret keys, from single factor authentication technology (Something You only have), multi-factor authentication technology (Something you only have+you only remember) is becoming common. However, there is a limit that it cannot cope with the loss or hacking of a smartphone in which the main authentication means are concentrated.

Blockchain is a P2P distributed ledger technology. The distributed ledger is protected by cryptography, and only inputting is possible and cannot be changed. Block generation (information generation) is possible only through consultation between participating nodes.

Blockchain is like a distributed P2P running on Internet-based technology. It functions like HTTP, SMTP, FTP, which operate on TCP/IP technology.

Blockchain was introduced along with the concept of Bitcoin in 2008 and was actually implemented and available in 2009. Bitcoin is a digital currency and blockchain provides the fundamental technology that enables the operation of Bitcoin. Various digital currencies such as Etherium, Ripple, and Altin based on the blockchain are appearing, and other than digital currency, blockchain is being applied to electronic signatures, copyright protection systems, certified authentication systems, and such.

Since there may be a variety of derived technologies depending on the consensus algorithm that generates the ledger, the blockchain is described here as a Bitcoin basis.

In Bitcoin, the method of generating a ledger is regarded as Proof of Work (POW). The basic concept is that in order to generate a ledger, the authority to generate is obtained by showing that sufficient computing resources have been invested in the network. At present, Bitcoin issues a problem that the node with the highest computing power can solve within 10 minutes among all the nodes involved in the generation of the ledger, and the first node to solve is given the authority to generate. Other methods of generating a ledger generates through consultation between nodes that have the authority to generate.

The storage of a ledger block stores a continuous hash value of the previous block, thereby it is managed in a way where it is impossible to insert a new block or modify the ledger block in the middle. Further, by distributing and storing the ledger blocks between nodes participating in the agreement process, it is possible to cope with a distributed denial of service (DDos) attack.

The problem with the blockchain technology is that in the case of PoW, it is expensive to maintain due to the maintenance cost associated with managing the ledger, and there is a problem of privacy infringement as the contents of the ledger are opened on the network. In addition, bitcoin withdrawal accidents due to the leakage of the secret keys of private users frequently occurs.

PRIOR ART

Patent Document

Korean Patent Registration No. 10-1678795

SUMMARY OF THE INVENTION

Technical Problem

The present application is intended to solve the above-described problems, and the problem to be solved is to deviate from a user authentication scheme that is centered on complexity such as a conventional cryptographic system, and provide a time-dependent blockchain-based self-verification user authentication method that achieves a safe user authentication by exposing all those participating in the procedurally-centered authentication, such as users, administrators and intruders, to the same conditions.

Technical Solution

As a means to achieve such objects of the present disclosure, provided is a time-dependent blockchain based self-verification user authentication method, including a reservation registration step for registering reservation time which is obtained by adding a set time to an input time, and an authentication subject to a blockchain which is distributed and stored in a plurality of nodes; a reservation notification step for notifying a notification group, which is associated with the authentication subject, of a reservation registered in the reservation registration step; a verification step for verifying authentication request time and the reservation time, which has been registered to the blockchain, when there is an authentication request with respect to the authentication subject; and a step for granting authentication when the authentication request time is within a valid range of the reservation time in the verification step.

In one embodiment, when there is an inquiry request in an inquiry group related to the authentication subject, the method may further include notifying the fact of the reservation registered in the blockchain.

In one embodiment, the reservation in the reservation registration step may be performed by the authority of an authentication group associated with the authentication subject.

In one embodiment, when the verification of the authentication request time and the reservation time registered in the block chain fails, the method may further include a verification failure notification step for notifying a notification group associated with the authentication subject.

Further, as another means to achieve such objects of the disclosure, provided is a time-dependent blockchain based self-verification user authentication method, including a reservation registration step for registering reservation time which is obtained by adding set time and input time, work to be performed, and an authentication subject to a blockchain which is distributed and stored in a plurality of nodes; a reservation notification step for notifying a notification group, which is associated with the authentication subject, of a reservation registered in the reservation registration step; a verification step for verifying a performance request time and the reservation time which has been registered to the blockchain, when there is a performance request with respect to the authentication subject; and a step for proceeding the work to be performed when the authentication request time is within a valid range of the reservation time in the verification step.

In one embodiment, the work to be performed may be an execution of a smart contract that is automatically performed when a specified condition is satisfied.

In one embodiment, the work to be performed may be remitting digital currency of a specified type and amount to a specified account.

In one embodiment, the reserved work to be performed and the proceeded work to be performed may be recovering an account secret key.

In one embodiment, a step of confirming pre-registration information of an account and receiving an input of a secret key recovery request for recovering the secret key in an authentication server may be further included.

In one embodiment, a step of posting the fact of the secret key recovery request which is work to be performed, on a notice bulletin board may be further included.

Advantageous Effects

The key function of the self-verification user authentication method according to one embodiment of the present disclosure is to establish a system that allows mutual monitoring between security participants. Breaking away from traditional ethics of administrators or encryption technology, it provides a user-centered environment to continuously check how their important data is managed. If it is possible to check and respond to the status of their own authentication information generation at any time, the security of the service can be ensured.

DETAILED DESCRIPTION OF THE INVENTION

Hereinafter, preferred embodiments will be described in detail with reference to the accompanying drawings so that those skilled in the art can easily carry out the present disclosure. However, in describing the preferred embodiments of the present disclosure in detail, if it is determined that the detailed description of related known functions or configurations may unnecessarily obscure the gist of the present disclosure, the detailed description thereof will be omitted. In addition, the same reference numerals are used throughout the drawings for parts having similar functions and actions.

In addition, throughout the specification, the description of 'including' any component does not exclude other components, but may further include other components unless specifically stated to the contrary.

Authentication: Authentication is to ensure the identity or message validity of an entity. Broadly, there are user (entity) authentication and data origin authentication. This paper deals with user (entity) authentication.

Non-cryptography: A technique mainly used offline. More specifically, the communication of face-to-face confidential contents such as through messenger (Pabalma) is mentioned as an example. This is a transmission/reception technology in which messages desired to be delivered are in plain text. The proposed technique shows that non-encryption technology can be used online.

User Participation: A concept introduced in the present disclosure, which means that a user of an authentication system can participate in and verify a process of generating authentication information. This ensures direct participation in the authentication process, without leaving it to a system or third parties alone.

Default Delayed Period: When entering reservation information into the authentication system, the reservation time must be registered before the preset time (e.g., −1 hour). Here, the preset time is referred to as a default delayed period.

Self-authentication: Refers to self-authentication and authentication information generated by the user directly participating in the authentication to confirm that the information is generated by the user.

Self-authenticating point: A self-authenticating point is an abstract conceptual diagram of a period during which the generated authentication information can be self-authenticated. After creating the authentication information (reservation), it is equal to the default delayed period.

Reservation Valid Period: Refers to the validity period of the reservation period when the reservation information is generated. Assuming the default set value is 30 minutes, if the reservation time is input as 14:00, it can be used until 14:30.

Operation Integrity: A subdivision of the existing data-centric integrity concept. Integrity verification by the participation of the user (self-authentication) is referred to as operation integrity.

Definition of intruders: Intruders can be divided into external intruders and internal intruders. Internal intruders refer to conspirators. It is assumed that the internal administrator of the authentication system can also tolerate user information.

Hereinafter, a blockchain based self-verification user authentication method according to the present disclosure will be described in more detail with reference to the accompanying drawings.

Requirements

In the requirements of the proposed technique according to an embodiment of the present disclosure, firstly, it is impossible to change data once recorded, and it is only possible to generate data. Secondly, when generating reservation information, only a value greater than or equal to a time in which a default delayed period is added to the current time can be input. Third, changes of setting values commanded by the administrator to the authentication system follows the first and second requirements. Describing the third requirement in more detail, even when attempting to change the setting values of the authentication system (default delayed period, authentication system usage time, login password) and such, a reservation history must be left and then after the default delayed period passes, the setting values can be changed.

The proposed technique assumes that a user's terminal, SMS (simple text service), mail and such can be hacked. Therefore, there might be no SMS notification that the reservation information has been generated.

Availability considerations should consider all areas, such as servers (authentication systems), clients (terminals), and communication networks. However, this study deals only with the authentication system (server) area. When the network and the terminal are unstable, it is assumed that the user has enough security awareness to be able to access the authentication system through various media that are accessible to the surroundings.

Further, in the event of a force majeure such as DDos (Distributed Denial Of Service) in the authentication system, if the authentication system exceeds the range that can cover the attack traffic, all commands after that point are automatically aborted. This is a measure to prevent integrity violations due to availability attacks.

Method of Operation

Figure 1:
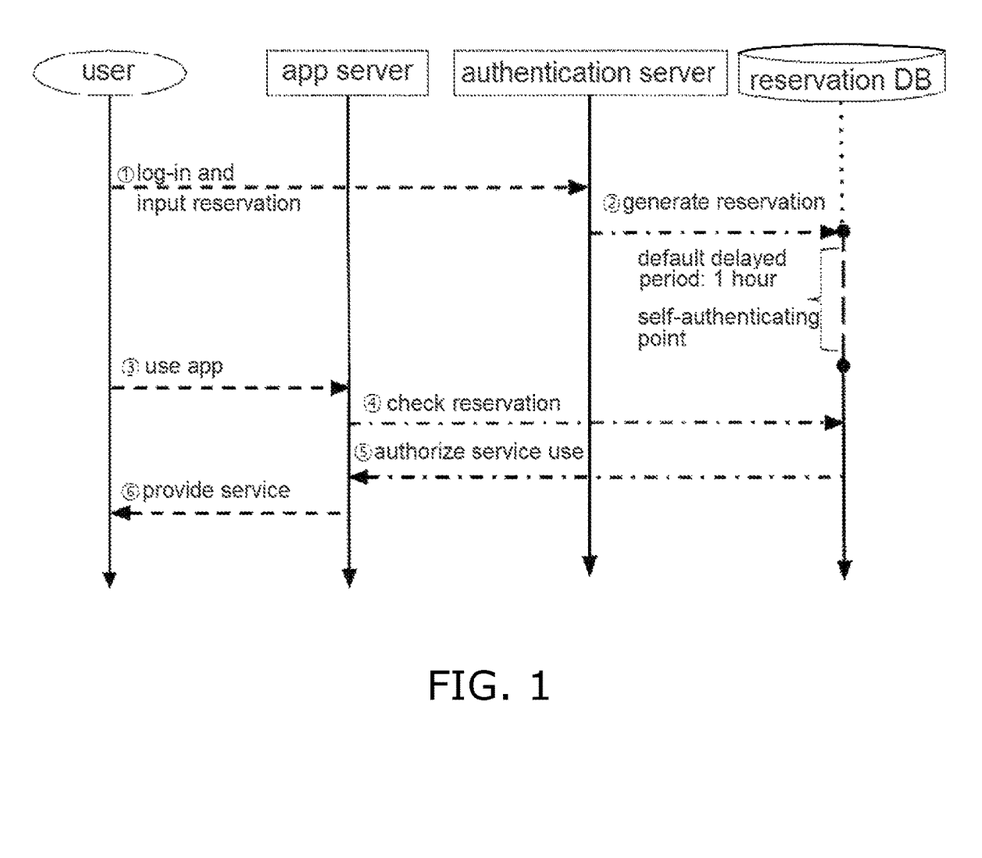
FIG. 1 is a sequence diagram illustrating a process of generating reservation information and using an application service in an authentication system.

FIG. 1 is a sequence diagram illustrating a process of generating reservation information and using an application service in an authentication system.

Referring to FIG. 1, the usage is the same as the general reservation service of the present disclosure. The difference is that a default delayed period is applied when generating the reservation information. Upon logging in to the authentication system and inputting reservation information as in ①, reservation information is generated in ②. The generated reservation information needs to be input with the addition of a default delayed period to the present time.

When the user accesses the application service to be used as in ③ in accordance with the reservation information input to the authentication system, the reservation information is checked in the authentication system as in ④, and ⑤ use of the application service is authorized. When the use of the service is authorized, ⑥ the app server provides the service to the user.

The services provided at this time can be limited to the type and range of services of when the ② reservation was generated. For example, if the user wants to proceed with a service to remit a certain amount of money to user A, and such information is specified at the time of reservation, the remittance cannot be proceeded to user B in ⑥ the service providing step. Such contents can specify various variables, such as not only a specific person, but also the type and amount of currency to be remitted, and the type of remittance bank used.

In the above, although the remittance was described as an example, the types of service work that can be performed by the app server can be widely applied, especially online contracts related to smart contracts or work associated with crypto-currency and such is possible to apply variously.

User Self-Authentication Process

[Table 1] shows how the user uses it in the usage flowchart sequence diagram. A self-authenticating point is shown in FIG. 1. When generating reservation information, a reservation time must be input as a time earlier than the time obtained by adding a default delayed period to the current time at the time of input. More specifically, an example is presented as in [Table 1].

TABLE 1

| Condition Name | Setting Value |
| --- | --- |
| Default Delayed Period (D) | 1 hour |
| Current Time (CT) | 14:00 |
| Reservation Time (A) | 14:50 |
| Reservation Time (B) | 15:00 |
| Reservation Time (C) | 15:30 |

Example 1) A<(CT+D)

Explanation 1) Reservation time is shorter than the default delayed period and reservation information cannot be generated Example 2) B=(CT+D)

Explanation 2) Reservation information cannot be generated because the reservation time is the same as the default delayed period Example 3) C>(CT+D)

Explanation 3) Reservation information can be generated because the reservation time is later than the default delayed period When the reservation information is generated, all the reservation information is generated before the default delayed period. Therefore, if the user can monitor only the history at a self-authenticating point, the user can confirm whether or not a third party including the authentication system administrator is tolerant.

Difference from Conventional Methods

Conventional user authentication methods are complexity-centered, and the proposed method is a procedurally-centered user authentication method. More specifically, a complexity-centered method is one that focuses on what only real users know (Something user knows) or what they have (Something user has). Therefore, in order to protect the medium and its contents, it relies on encryption technology that is difficult for third party to crack. However, the limitations of encryption technology are becoming clearer as the cloud computing environment is becoming more universal. Complexity-based cryptography is becoming easier to decrypt because anyone can buy computing resources at low prices. That said, increasing the size of unrestricted passwords (including secret keys) is unreasonable.

The procedurally-centered user authentication method enforces a specific procedure in the authentication process. Therefore, it is possible to allow a user to monitor a specific procedure and determine whether it is authorized. As a specific example, in order to enter and exit the authentication system with a specific procedure, the user is forced to wait unconditionally in the waiting room for a certain period of time without discrimination between the users, so during the certain waiting time, the user is offered the opportunity to monitor any impersonation by a third party during the waiting time. Just with such an opportunity given, even if the internal administrator of the authentication system obtains the user's password, it cannot be easily tolerated. It has the effect of mutual monitoring. However, availability must be ensured so that the user can monitor the waiting room at any time.

Information Security Requirements

Figure 2:
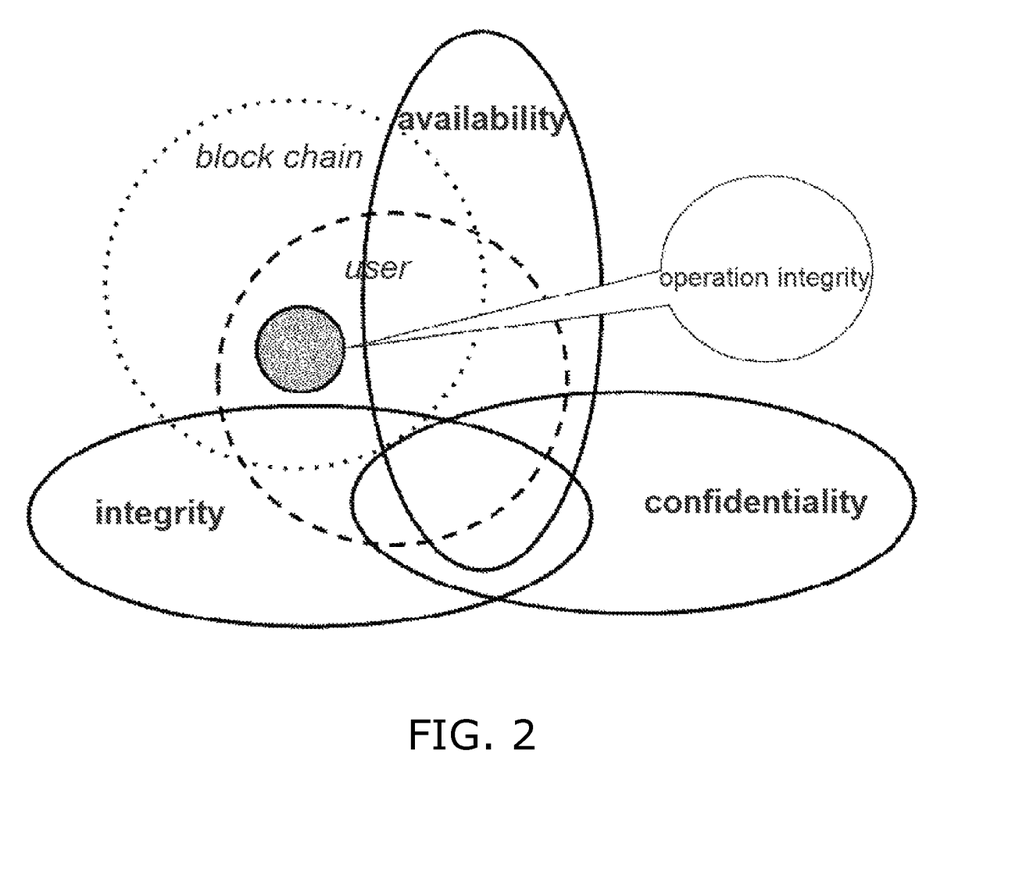
FIG. 2 is a conceptual diagram illustrating characteristics of an authentication method according to an embodiment of the present disclosure.

FIG. 2 is a conceptual diagram illustrating characteristics of an authentication method according to an embodiment of the present disclosure.

Referring to FIG. 2, the three elements of security include confidentiality, availability, and integrity. Data protection also requires the three elements of security.

Confidentiality ensures that data can be accessed by only authorized entities. Integrity ensures that data can only be modified by entities that have authority. Availability means that service is continuously maintained and information is provided to authorized entities. In the proposed method, availability is an essential element, and users should be able to access the authentication system at any time to check the usage history.

In the case of a general blockchain, the information is put in and disclosed in the blockchain, so confidentiality is eliminated, but the integrity that only those who have the availability and authority to provide the information can modify it is ensured.

In the case of the authentication method according to the present disclosure, the object of the present disclosure is to introduce operation integrity by combining user authentication methods to blockchain methods.

Extended Concept of Integrity (Operation Integrity)

The conventional definition of integrity is to ensure that data can be changed only by authorized entities. Conventional integrity is focused on data only. In the self-authentication process introduced by the proposed method, the concept of integrity is extended as shown in [Table 2] below. As shown in [Table 2], operation of self-authentication of the user performs the role of ensuring the integrity.

TABLE 2

| Conventional Meaning of Integrity | Extended Meaning of Integrity |
| --- | --- |
| Data | Data (Static) Operation (Reflects User Role) |

The fact that the meaning of integrity in the present disclosure is subdivided into data and operation as shown in [Table 2] do not depart from the original meaning of integrity. The concept of integrity has a meaning that it cannot be changed without authority. In addition to the concept data of integrity, the extended meaning added with the operation reflecting the role of the user does not destroy the fundamental meaning of integrity.

Confidentiality means ensuring that only authorized entities can access data. However, by introducing operation integrity where users can participate, the confidentiality role can be drawn as shown in [Table 2]. If an intruder gains a user's secret (including password), the existing data-centric confidentiality will be destroyed. However, even if an intruder can generate the reservation information, it will not be able to achieve any of the intruder's desired purposes of exploitation without passing through the user's self-authenticating point. Therefore, the purpose of confidentiality also works in introducing the concept of operation integrity in which the user participates.

Explaining with [Table 2], the three elements of information security require availability, integrity, and confidentiality. The proposed method utilizes blockchain technology to ensure availability and integrity. Here, by connecting the blockchain with confidentiality by participating users, the three elements of information security are completed. The connected part is referred to as operation integrity.

Ensuring Availability

Figure 3:
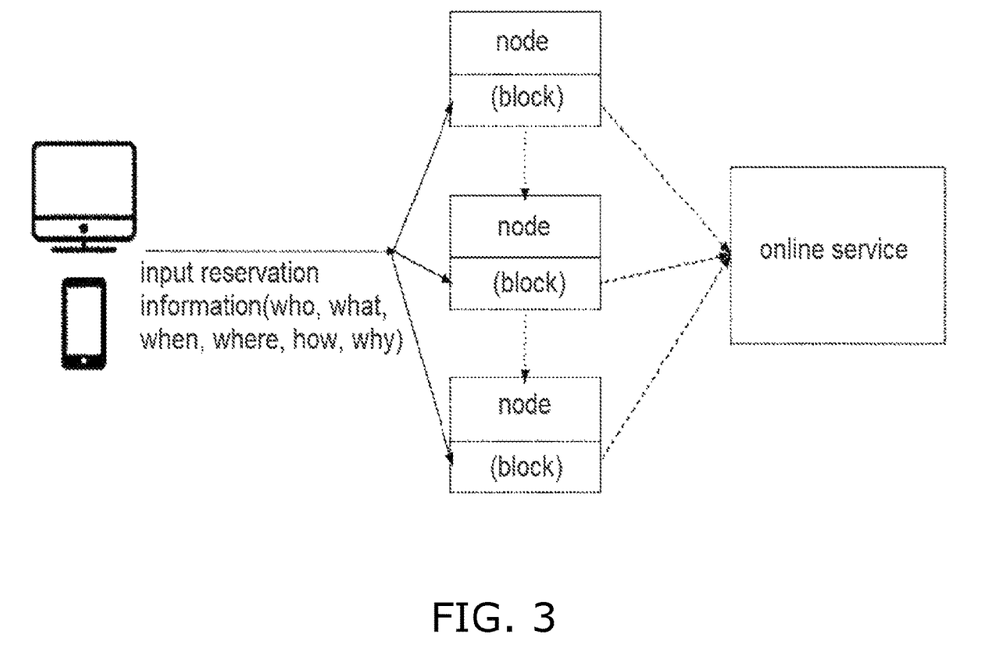
FIG. 3 is a conceptual diagram for describing a process of a self-authentication system according to an embodiment of the present disclosure.

FIG. 3 is a conceptual diagram for describing a process of a self-authentication system according to an embodiment of the present disclosure.

Self-authentication systems must ensure that users can participate in operation integrity verification at any time. If a user cannot access the self-authenticating point at any time, it cannot defend against the exploit of an intruder.

Therefore, availability for accessing the authentication system at any time must be ensured.

The strong point of blockchain technology is that data is distributed and stored, and nodes communicate with each other and operate autonomously. As shown in FIG. 3, the reservation information is distributed and stored equally for each node. Further, since each node independently performs the role of an individual server, even if some nodes are unstable, services can be continued through other nodes, so that availability can be ensured.

Comparison Between Blockchain and Self-Authentication System

Figure 4A:
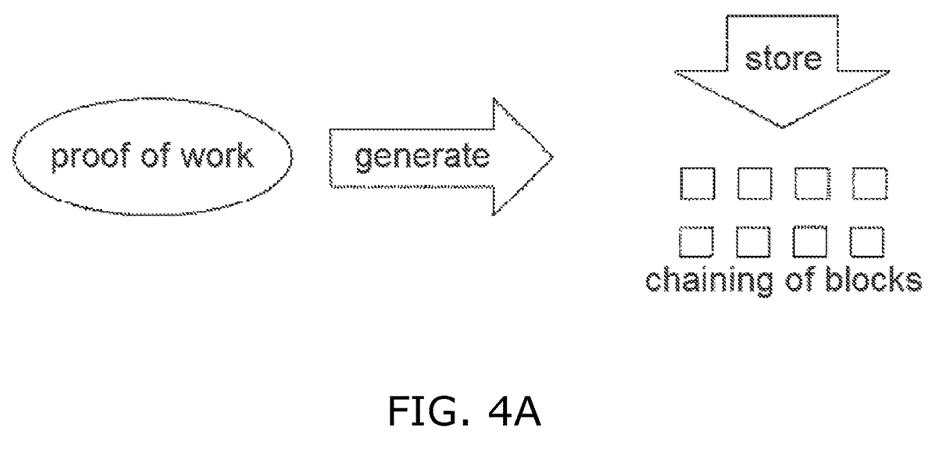
FIGS. 4a and 4b are conceptual diagrams illustrating chaining of blocks of a self-authentication system according to an embodiment of the present disclosure.
Figure 4B:
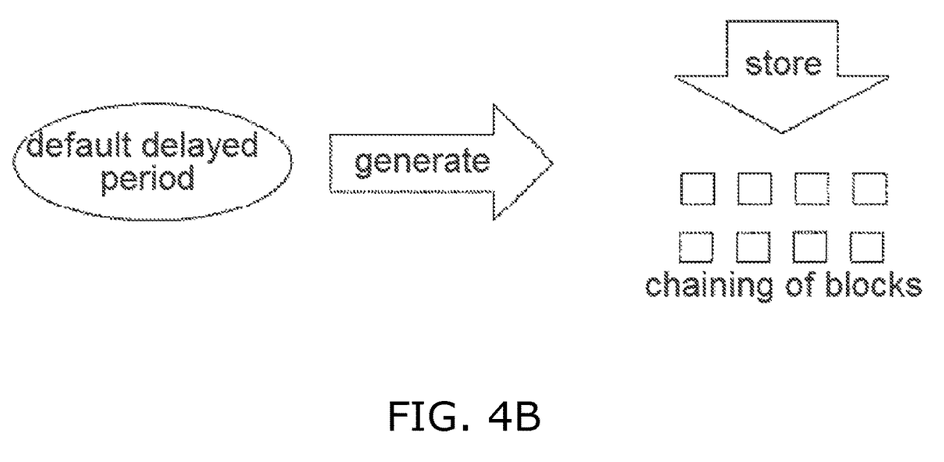

FIGS. 4a and 4b are conceptual diagrams illustrating a chaining of blocks of a self-authentication system according to an embodiment of the present disclosure.

FIG. 4a is a conceptual diagram illustrating a conventional chaining of blocks. The blockchain can process important information such as digital currency because digital information is generated via proof of work, and storing is managed by chaining of blocks. The generation process is based on agreement among most participants, although there are various algorithms in addition to the proof of work.

FIG. 4b is a conceptual diagram illustrating chaining of blocks of the self-authentication system of the present disclosure. A self-authentication system is a user authentication system based on a blockchain. In the self-authentication system of the proposed method, the generated digital information (reservation information) is filtered by a person responsible, by forcing a default delayed period when generating the authentication information (reservation information).

Operation Process

Figure 5:
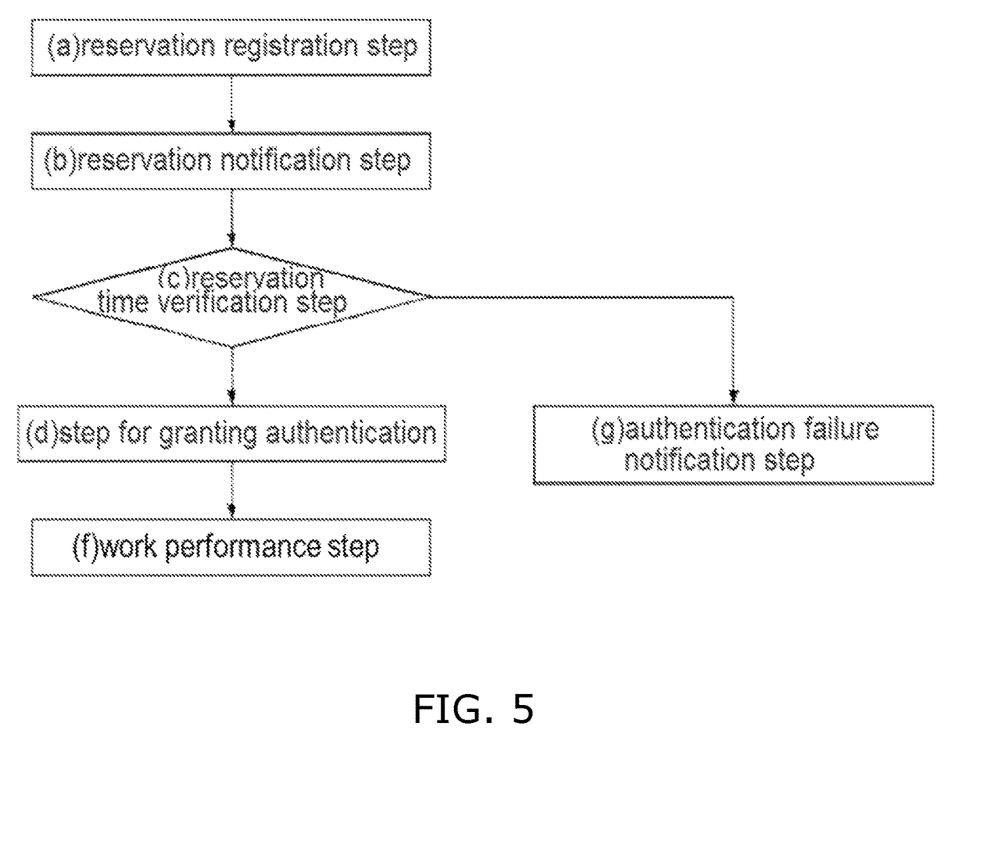
FIG. 5 is a flowchart illustrating a time-dependent blockchain based self-verification user authentication method according to an embodiment of the present disclosure.

FIG. 5 is a flowchart illustrating a time-dependent blockchain based self-verification user authentication method according to an embodiment of the present disclosure.

Referring to FIG. 5, a method of authenticating a time-dependent blockchain based verification user according to an embodiment of the present disclosure includes: (a) a reservation registration step; (b) a reservation notification step, (c) a reservation time verification step, and (d) a step for granting authentication. In addition, the method may further include (f) work performance step and (g) authentication failure notification step.

In the (a) reservation registration step, the reservation time obtained by adding the set time to the input time, and the authentication subject are registered in a block chain distributed and stored in a plurality of nodes. At this time, the data registered in the block chain are the reservation time and the authentication subject. Of course, according to an embodiment, the data being registered in the blockchain can include the content of the work to be performed that the authentication subject intends to perform.

Further, in such a procedure for registering a reservation, a reservation can be registered in a group having another authority permitted to a person other than the authenticator. The fact that the registration reservation of an authentication remains the same and can be selected for private or public use has the advantage that it can be carried out by an authorized group other than oneself.

In the (b) reservation notification step, the reservation registered in the reservation registration step is notified to a notification group related to the authentication subject. These notification groups can be the authentication subject themselves and can include administrators who manage services.

If necessary, these reservation notification procedures operate a bulletin board on separate server so that general users can view the contents openly. Therefore, the fact that the reservation has been made is the fact that the authenticating entity, administrator third party can publicly confirm. Of course, this can be confirmed by inquiry of the facts registered in the blockchain.

In the (c) verification step, when there is an authentication request from the authentication subject, the authentication request time and the reservation time registered in the block chain are verified. At this time, since the authentication subject executes the authentication processing at the time reserved in advance, the authentication time can be verified, and if the request is not made at an appropriate time, it can be rejected.

In the (d) step for granting authentication, when the authentication request time is within a valid range of the reservation time at the verification step, the authentication is granted. Thus, authentication can be performed at a specified time after the fact that the authentication has been made public has been announced.

In this case, if there is a hacker or malicious intrusion without knowing the actual authentication subject, (a) the fact that these malicious intrusions are not changed by the fact of reservation registration is publicized in the blockchain, and separately, (b) the fact that such an attempt was made on the authentication subject is confirmed due to the reservation notification fact. Accordingly, the authentication performer has the opportunity to cancel or defend these hackers or malicious intrusion attempts within a set time.

In the (f) work performance step, an authenticated user performs work or receives provision of a service. If the nature of the work that can be performed after authentication is restricted in the (a) reservation registration step, only the work permitted in the reservation step can be performed. The limits of such work can be limited to various ranges, and various variables can be used, such as the content, target, timing, and method of performing the task.

In particular, such work to be performed may be an execution of a smart contract designed such that a preset contract is executed that is automatically performed when a specified condition is satisfied. By announcing smart contracts on the blockchain, it is possible to guarantee unchanging contract contents. Therefore, when the specified condition is satisfied, for example, work for remitting digital currency of a specified type and amount to a specified account to a preset subject can be defined.

Apart from this, when the user authentication fails, through the (g) authentication failure notification step, such failure of authentication processes can be individually notified. If there is an attempt to authenticate reserved work that has not been verified, it will be notified that there was an authentication attempt that failed and will be able to recognize and protect against hackers and malicious intrusions.

Example-Recovering an Account Secret Key

Figure 6:
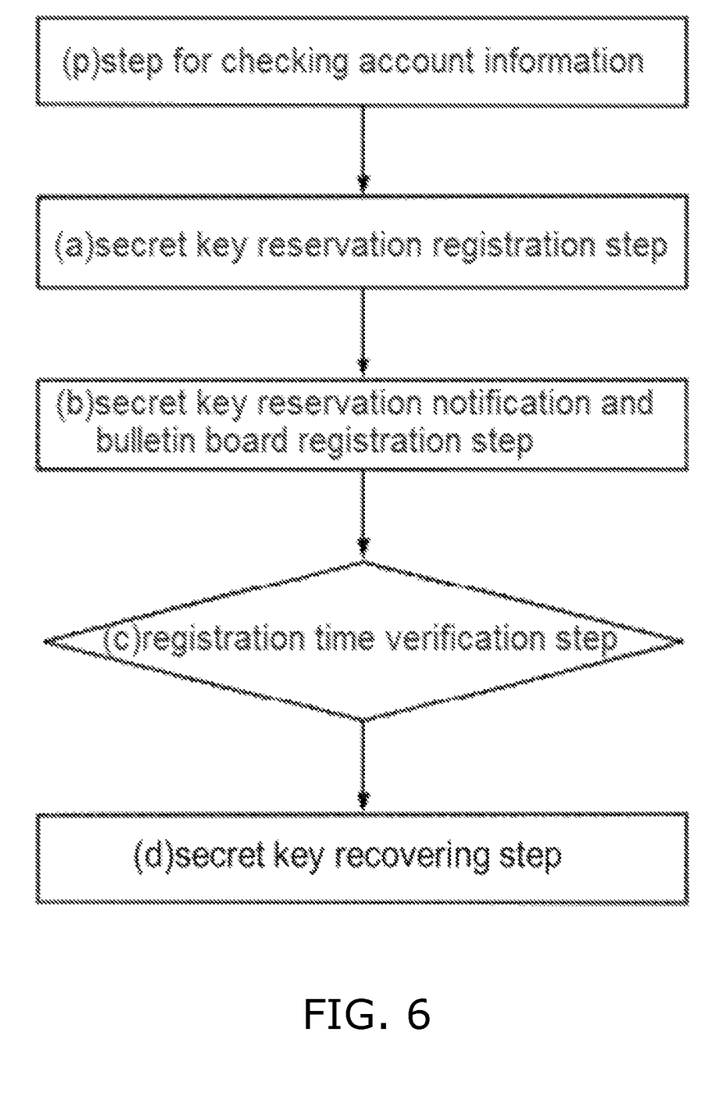
FIG. 6 is a flowchart illustrating a blockchain based self-verification user authentication method according to an embodiment of the present disclosure.

FIG. 6 is a flowchart illustrating a blockchain based self-verification user authentication method according to an embodiment of the present disclosure. FIG. 6 is an embodiment in which such an authentication method is particularly applied to a method for recovering a secret key of an account.

The account secret key is a key value used to authenticate the account, such as an account password. If it is lost and needs to be newly recovered, since the entire authority of the account has to be re-established, very strict security must be applied. Particularly, for superusers who manage an entire service, the management of these keys must be very strictly protected.

In order to recover the secret key, the user first p) checks the pre-registration information of the account in the authentication server, and inputs a secret key recovery request for recovering the secret key. The pre-registration information of the account used at this time is basic personal information such as birth date, social information such as family name and birthday, password for recovery, authentication using mobile phone number, authentication via public certificate and such, and at the same time a the generation of an account, this can be input and prepared.

In step (a), secret key recovering work is reserved and registered in the blockchain. The work to be performed applied at this time is limited to secret key recovering work, and work after authorization is also limited to the secret key recovering work of the account. As in the previous embodiment, the reservation of the account's secret key recovering work is recorded via the blockchain and remains as an immutable record.

(b) The fact of the secret key reservation is notified to a preset relevant group, and in particular, the fact of a secret key recovery of an account with the same high authority as a super user, can notify to a plurality of users by registering on a separately managed bulletin board. As a result, the fact that the secret keys of the parties and the general third parties have been recovered is recognized.

(c) When requested by the user, as described above, it is determined whether verification is performed at a valid time, and the work is performed only when this process is performed within the valid time.

If it is confirmed as valid authentication, (d) recovery of the secret key can be performed and this can be provided.

The present disclosure is not limited by the above-described embodiment and the accompanying drawings. It is apparent to a person having ordinary knowledge in the technical field to which the present disclosure pertains that components according to the present disclosure can be replaced, modified, and changed without departing from the technical spirit of the present disclosure.

The invention claimed is:

1. A time-dependent blockchain based self-verification user authentication method, comprising,
   a) a reservation registration step for registering reservation time which is obtained by adding a set time to an input time, and an authentication subject to a blockchain which is distributed and stored in a plurality of nodes;
   b) a reservation notification step for notifying a notification group, which is associated with the authentication subject, of a reservation registered in the reservation registration step;
   c) a verification step for verifying authentication request time and the reservation time, which has been registered to the blockchain, when there is an authentication request with respect to the authentication subject; and
   d) a step for granting authentication when the authentication request time is within a valid range of the reservation time in the verification step.

2. The method of claim 1, further comprising after the step of b),
   e) when there is an inquiry request in an inquiry group related to the authentication subject, a step of notifying the fact of the reservation registered in the blockchain.

3. The method of claim 1, wherein the reservation in (a) the reservation registration step is performed by the authority of an authentication group associated with the authentication subject.

4. The method of claim 1, wherein in the step of c), when the verification of the authentication request time and the reservation time registered in the block chain fails,
   further comprising g) a verification failure notification step for notifying a notification group associated with the authentication subject.

5. A time-dependent blockchain based self-verification user authentication method, comprising,
   a) a reservation registration step for registering reservation time which is obtained by adding set time and input time, work to be performed, and an authentication subject to a blockchain which is distributed and stored in a plurality of nodes;
   b) reservation notification step for notifying a notification group, which is associated with the authentication subject, of a reservation registered in the reservation registration step;
   c) a verification step for verifying a performance request time and the reservation time which has been registered to the blockchain, when there is a performance request with respect to the authentication subject; and
   d) step for proceeding the work to be performed when the authentication request time is within a valid range of the reservation time in the verification step.

6. The method of claim 5, wherein the work to be performed is an execution of a smart contract that is automatically performed when a specified condition is satisfied.

7. The method of claim 5, wherein the work to be performed is remitting digital currency of a specified type and amount to a specified account.

8. The method of claim 5, wherein the reserved work to be performed in the step of a) and the proceeded work to be performed in the step of d) is recovering an account secret key.

9. The method of 8, wherein before the step of a), further comprising p) a step of confirming pre-registration information of an account and receiving an input of a secret key recovery request for recovering the secret key in an authentication server.

10. The method of claim 9, wherein the step of b) further comprises posting the fact of the secret key recovery request which is the work to be performed, on a notice bulletin board.

* * * * *